United States Patent
Berthold et al.

(10) Patent No.: US 9,493,590 B2
(45) Date of Patent: Nov. 15, 2016

(54) TRIMODAL POLYETHYLENE FOR USE IN BLOW MOULDING

(75) Inventors: Joachim Berthold, Grassau (DE); Bernd Lothar Marczinke, Römerberg (DE); Diana Dötsch, Mainz (DE); Rainer Sattel, Waldsee (DE); Iakovos Vittorias, Mainz (DE); Peter Bisson, Ludwigshafen (DE)

(73) Assignee: Basell Polyolefine GmbH, Wesseling (DE)

( * ) Notice: Subject to any disclaimer, the term of this patent is extended or adjusted under 35 U.S.C. 154(b) by 999 days.

(21) Appl. No.: 13/504,458

(22) PCT Filed: Nov. 22, 2010

(86) PCT No.: PCT/EP2010/007058
§ 371 (c)(1),
(2), (4) Date: Apr. 26, 2012

(87) PCT Pub. No.: WO2011/060954
PCT Pub. Date: May 26, 2011

(65) Prior Publication Data
US 2012/0214926 A1 Aug. 23, 2012

Related U.S. Application Data

(60) Provisional application No. 61/284,219, filed on Dec. 15, 2009.

(30) Foreign Application Priority Data

Nov. 20, 2009 (EP) .................................... 09014492

(51) Int. Cl.
*C08F 10/00* (2006.01)
*C08F 210/16* (2006.01)
*C08F 10/02* (2006.01)
*C08F 10/08* (2006.01)

(52) U.S. Cl.
CPC .............. *C08F 210/16* (2013.01); *C08F 10/00* (2013.01); *C08F 10/02* (2013.01); *C08F 10/08* (2013.01)

(58) Field of Classification Search
CPC ........... C08L 23/06; C08L 23/08; C08F 10/02; C08F 10/08
USPC ........................................................ 524/284
See application file for complete search history.

(56) References Cited

U.S. PATENT DOCUMENTS 5,648,309 A * 7/1997 Bohm .......................... 502/105
2006/0074194 A1 4/2006 Berthold et al.

FOREIGN PATENT DOCUMENTS

| EP | 1228101 | | 4/2001 | |
|---|---|---|---|---|
| WO | WO 9118934 A1 * | 12/1991 | .............. C08F 4/654 |
| WO | WO-2004/056921 | | 7/2004 | |
| WO | WO-2004/058878 | | 7/2004 | |
| WO | WO 2009077142 A1 * | 6/2009 | .............. C08L 23/06 |
| WO | WO-2010/034520 | | 4/2010 | |

* cited by examiner

*Primary Examiner* — Michael Pepitone

(57) ABSTRACT

A novel polyethylene formed by Ziegler catalyst is devised, for use in blow moulding.

15 Claims, No Drawings

TRIMODAL POLYETHYLENE FOR USE IN BLOW MOULDING

This application is the U.S. national phase of International Application PCT/EP2010/007058, filed Nov. 22, 2010, claiming priority to European Application 09014492.4 filed Nov. 20, 2009 and the benefit under 35 U.S.C. 119(e) of U.S. Provisional Application No. 61/284,219, filed Dec. 15, 2009; the disclosures of International Application PCT/EP2010/007058, European Application 09014492.4 and U.S. Provisional Application No. 61/284,219, each as filed, are incorporated herein by reference.

The present invention relates to a novel trimodal polyethylene for use for blow mouldings having improved dimensional stability after moulding. Blow-moulded articles made thereof are a further object of the present invention.

For blow moulding applications, PE resins are required in general to combine good processability, high surface quality of the finished article and a good balance of mechanical properties (stiffness, impact resistance, environmental stress crack resistance). Already this is difficult to realize simultaneously for Ziegler products. Special applications require the polyethylene to fulfill additional properties.

Trimodal polyethylene for use in blow moulding of cans and containers of up to 150 L, obtained by Ziegler catalysis, is known e.g. from EP-1228101. Use of a Ziegler catalyst ensures good processing properties of the ensuing polymer, and allows of obtaining good mechanical properties, in particular a good ESCR. Especially in industry, barrels made from polyethylene materials are often used for packaging chemicals or other hazardous substance, such PE materials excelling by superior stiffness and stress crack resistance of the ensuing blow mouldings. When used for drums, a simple but nonetheless aspect gains weight, dimensional stability or conformity of the moulded article with the mould. This for the simple reason, that closure of a drum by a lid is not safe if the moulded article tends not to conform with the dimensions of the mould after release therefrom and cooling down. Such dimensional deviation, otherwise coined warpage, is routinely observed, but needs to be minimized. Polyethylene obtained from Phillips-type Chromium oxide catalysts is known to display very little warpage, but suffers from very broad molecular weight distribution unsuitable for multimodal product engineering.

It is an object of the present invention to devise a novel high density polyethylene for blow moulding of e.g. and preferably larger canisters >20 L volume, preferably of from 10 or 20 L up to 50 L volume, or barrels or drums of from 100 to 150 L volume, obtained by a non-Phillips catalyst, conferring improved dimensional stability to the moulded article after release from the mould and cooling to ambient temperature.

This object is solved by a trimodal polyethylene, preferably for use in blow moulding, having a density of from 0.950 to 0.960 g/cm$^3$, preferably of from 0.954 to 0.958 g/cm$^3$, and a melt index (HLMI) according to ASTM D-1238, at 190° C. and 21.6 kg, of from 3 to 6 g/10 min., produced by polymerisation with a Ziegler catalyst.

It is further preferred to obtain such product by using a Ziegler solid catalyst component comprising the product of a process comprising (a) reacting a magnesium alcoholate of formula Mg(OR$_1$)(OR$_2$) compound, in which R$_1$ and R$_2$ are identical or different and are each an alkyl radical having 1 to 10 carbon atoms, with titanium tetrachloride carried out in a hydrocarbon at a temperature of 50-100° C., (b) subjecting the reaction mixture obtained in (a) to a heat treatment at a temperature of 110° C. to 200° C. for a time ranging from 3 to 25 hours (c) isolating and washing with a hydrocarbon the solid obtained in (b), said solid catalyst component having a Cl/Ti molar ratio higher than 2.5

In the preparation of the catalyst component (A), R$_1$ and R$_2$ are preferably alkyl groups having from 2 to 10 carbon atoms or a radical —(CH$_2$)$_n$OR$_3$, where R$_3$ is a C$_1$-C$_4$-alkyl radical and n is an integer from 2 to 6. Preferably R$_1$ and R$_2$ are C$_1$-C$_2$-alkyl radical. Examples of such magnesium alkoxides are: magnesium dimethoxide, magnesium diethoxide, magnesium di-i-propoxide, magnesium di-n-propoxide, magnesium di-n-butoxide, magnesium methoxide ethoxide, magnesium ethoxide n-propoxide, magnesium di(2-methyl-1-pentoxide), magnesium di(2-methyl-1-hexoxide), magnesium di(2-methyl-1-heptoxide), magnesium di(2-ethyl-1-pentoxide), magnesium di(2-ethyl-1-hexoxide), magnesium di(2-ethyl-1-heptoxide), magnesium di(2-propyl-1-heptoxide), magnesium di(2-methoxy-1-ethoxide), magnesium di(3-methoxy-1-propoxide), magnesium di(4-methoxy-1-butoxide), magnesium di(6-methoxy-1-hexoxide), magnesium di(2-ethoxy-1-ethoxide), magnesium di(3-ethoxy-1-propoxide), magnesium di(4-ethoxy-1-butoxide), magnesium di(6-ethoxy-1-hexoxide), magnesium dipentoxide, magnesium dihexoxide. Preference is given to using the simple magnesium alkoxides such as magnesium diethoxide, magnesium di-n-propoxide and magnesium di-isobutoxide. Magnesium diethoxide is especially preferred.

The magnesium alkoxide can be used as a suspension or as a gel dispersion in a hydrocarbon medium. Use of the magnesium alkoxide as a gel dispersion constitutes a preferred embodiment. In general, commercially available magnesium alkoxides, in particular Mg(OC$_2$H$_5$)$_2$, has average particle diameter ranging from 200 to 1200 μm preferably about 500 to 700 μm. In order to have optimal results in the catalyst preparation it is preferable to substantially reduce its particle size. In order to do so, the magnesium alcoholate is suspended in an inert, saturated hydrocarbon thereby creating a hydrocarbon suspension. The suspension can be subject to high shear stress conditions by means of a high-speed disperser (for example Ultra-Turrax or Dispax, IKA-Maschinenbau Janke & Kunkel GmbH) working under inert atmosphere(Ar or N2). Preferably the shear stress is applied until a gel-like dispersion is obtained. This dispersion differs from a standard suspension in that it is substantially more viscous than the suspension and is gel-like. Compared with the suspended magnesium alcoholate, the dispersed magnesium alcoholate gel settles down much more slowly and to a far lesser extent.

As already explained, in the first step, the magnesium alkoxide is reacted with TiCl$_4$ in an inert medium.

The reaction of the magnesium alkoxide with TiCl$_4$ is carried out at a molar ratio of Ti/Mg higher than 1 and preferrably in the range 1.5 to 4, and more preferably in the range of 1.75 to 2.75, at a temperature from 50 to 100° C., preferably from 60 to 90° C. The reaction time in the first stage is 0.5 to 8 hours, preferably 2 to 6 hours.

Suitable inert suspension media for the abovementioned reactions include aliphatic and cycloaliphatic hydrocarbons such as butane, pentane, hexane, heptane, cyclohexane, isooctane and also aromatic hydrocarbons such as benzene and xylene. Petroleum spirit and hydrogenated diesel oil fractions which have carefully been freed of oxygen, sulfur compounds and moisture can also be used.

In a successive step (b) the so obtained reaction mixture containing the product of the reaction between the magnesium alcoholate and the transition metal compound is subject to a thermal treatment at a temperature ranging from 80°

C. to 160° C., preferably from 100° C. to 140° C., for a period of time ranging from 3 to 25 hours, preferably from 5 to 15 hours before split-off process of alkyl chloride is complete. At the end of the preparation process particle size of the catalyst component (A) preferably ranges from 5 to 30 μm and more preferably from 7 to 15 μm.

After step (b) is completed, hydrocarbon washings at temperatures ranging from 60 to 80° C. can be carried out until the supernatant mother liquor has Cl and Ti concentrations of less than 10 mmol/l. As explained the solid obtained at the end of the washing step (c) has a Cl/Ti molar ratio of at least 2.5, preferably at least 3 and more preferably ranging from 3 to 5. The solid obtained has the following typical composition: Mg:Ti:Cl=1:(0.8-1.5):(3.2-4.2).

In certain more preferred embodiments, t proved advantageous to carry out a further stage (d), in which the obtained solid is contacted with an aluminum alkyl halide compound in order to obtain a final solid catalyst component in which the Cl/Ti molar ratio is increased with respect to that of the solid before step (d).

The alkylaluminum chloride is preferably selected from the dialkylaluminum monochlorides of the formula $R_2^3AlCl$ or the alkylaluminum sesquichlorides of the formula $R_3^3Al_2Cl_3$ in which $R^3$ can be identical or different alkyl radicals having 1 to 16 carbon atoms. The following may be mentioned as examples: $(C_2H_5)_2AlCl$, $(isobutyl)_2AlCl$ and $(C_2H_5)_3Al_2Cl_3$, (ethylaluminum sesquichloride), this latter being preferred. The reaction can be carried out in a stirred vessel at a temperature of from –0° C. to 150° C., preferably from 30° C. to 100° C. for a time ranging from 0.5 to 5 hours.

The aluminum alkylchloride compound is used in amounts such that the Al/Ti molar ratio (calculated with reference to the Ti content of the solid catalyst component as obtained by the previous step) is from 0.05 to 1, preferably from 0.1 to 0.5.

As explained, this latter reaction generates a final solid catalyst component in which the Cl/Ti molar ratio is increased and generally being at least 3 most preferably higher than 3.5.

By effect of this latter step (d) a certain extent of the titanium atoms may be reduced from oxidation state $Ti^{+4}$ to oxidation state $Ti^{III}$.

The so obtained catalyst component is used together with an organo aluminum compound (B) in the ethylene polymerization.

The organoaluminum compound (B) is preferably selected from the trialkyl aluminum compounds such as for example trimethylaluminum (TMA), triethylaluminum (TEAL), triisobutylaluminum (TIBA), tri-n-butylaluminum, tri-n-hexylaluminum, tri-n-octylaluminum, triisoprenylaluminum. Also alkylaluminum halides and in particular alkylaluminum chlorides such as diethylaluminum chloride (DEAC), diisobutylalumunum chloride, Al-sesquichloride and dimethylaluminum chloride (DMAC) can be used in mixture with said trialuminum alkyls. Use of TEAL and TIBA is preferred.

In addition to the above mentioned characteristics the solid catalyst component (a) may show a porosity $P_F$ determined with the mercury method higher than 0.40 cm³/g and more preferably higher than 0.50 cm³/g usually in the range 0.50-0.80 cm³/g. The total porosity $P_T$ can be in the range of 0.50-1.50 cm³/g, particularly in the range of from 0.60 and 1.20 cm³/g, and the difference $(P_T-P_F)$ can be higher than 0.10 preferably in the range from 0.15-0.50. The surface area measured by the BET method is preferably lower than 80 and in particular comprised between 10 and 70 m²/g. The porosity as measured by the BET method is generally comprised between 0.10 and 0.50, preferably from 0.10 to 0.40 cm³/g. In fact, small average particle size, such as less than 30 μm, preferably ranging from 7 to 15 μm, are particularly suited for slurry polymerization in an inert medium, which can be carried out continuously in stirred tank reactors or in loop reactors. $d_{50}$ (mean particle diameter) is determined in accordance with DIN 53477 and DIN66144.

The so formed catalyst system can be used directly in the main polymerization process or alternatively, it can be pre-polymerized beforehand.

The batch pre-polymerization of the catalyst of the invention with ethylene in order to produce an amount of polymer ranging from 0.5 to 20 g per gram of catalyst component is particularly preferred. The pre-polymerization step can be carried out at temperatures from 0 to 80° C., preferably from 5 to 70° C., in the liquid or gas phase. The pre-polymerization step can be performed in-line as a part of a continuous polymerization process or separately in a batch process.

The catalyst of the invention can be used in any kind of polymerization process both in liquid and gas-phase processes. Catalysts having small particle size, (less than 40 μm) are particularly suited for slurry polymerization in an inert medium, which can be carried out continuously stirred tank reactor or in loop reactors. Catalysts having larger particle size are particularly suited for gas-phase polymerization processes which can be carried out in agitated or fluidized bed gas-phase reactors.

The following examples are given in order to further illustrate the present invention by way of example

EXPERIMENTS

The density [g/cm³] was determined in accordance with ISO 1183.

The results for the elemental composition of the catalysts described reported in the examples were obtained by the following analytical methods:
Ti: photometrically via the peroxide complex
Mg, Cl: titrimetrically by customary methods
Melt Index:
Melt index (M.I.) are measured at 190° C. following ASTM D-1238 over a load of:
2.16 Kg, MI E=$MI_{2.16}$.
21.6 Kg, MI F=$MI_{21.6}$.
5 Kg, MI P=$MI_5$
MWD:
The molecular weight distribution is also measured by way of Gel Permeation Chromatography which is carried out according to the method based on DIN 55672 under the following conditions:
Solvent: 1, 2, 4-trichlorobenzene, flow: 1 ml/min, temperature: 140° C., calibration using PE standards. A detailed description of the very method used for determination of Mw, Mn and MWD may be found in WO2010/034520.

Example 1 (According to the Invention)

a) Preparation of the Catalyst Component A:

A suspension of 4.0 kg (=35 mol) of commercial available Mg(OC2H5)₂ in 25 dm³ of diesel oil having a boiling range from 140 to 170° C. (hydrogenated petroleum fraction) have been treated in a high speed disperser (Krupp Supraton™ type S200) at 120° C. for a period of 12 hours thus forming a gel-like dispersion. This Mg(OC2H5)₂-dispersion was transferred to a 130 dm³ reactor equipped with an impeller stirrer and baffles and which already contained 19 dm$^3$ of dieseloil. After rinsing with 5 dm$^3$ of dieseloil 7.6 dm$^3$ (=70 mol) of TiCl$_4$, diluted to 10 dm$^3$ with dieseloil, were then added at 70° C. over a period of 6 hours at a stirring speed of 80 rpm. Afterwards the mixture was heated at T=120° C. for 5 hours. 50 dm$^3$ of diesel oil having a boiling range from 140 to 170° C. (hydrogenated petroleum fraction) were then added and the mixture was cooled to T=65° C. After the solid had settled, the supernatant liquid phase (mother liquor) was then decanted off to a residual volume of 50 dm$^3$. 50 dm$^3$ of fresh diesel oil (hydrogenated petroleum fraction having a boiling range from 140 to 170° C.) were subsequently introduced. After a stirring time of 20 minutes and a sedimentation period of ca. 90 minutes the supernatant liquid was again decanted off to a residual volume of 50 dm$^3$. This washing procedure was repeated until the titanium concentration of the mother liquor was less than 10 mmol/dm$^3$.

The suspension was then cooled to room temperature. The titanium content was 0.22 gcatalyst/mmolTi and the molar ratio of the solid (catalyst component A) was:

Mg:Ti:Cl≈1:1.34:3.81.

Now, in a further step (corresponding to step d) in the description), the Catalyst component A was preactivated with Aluminium-sesquichloride (EASC) in a further 'washing' step. The molar Al/Ti-ratio was 0.25:1. The reaction was performed at 85° C. for a time-period of 2 hours.

The titanium content was 0.22 gcatalyst/mmolTi and the molar ratio of the solid (catalyst component A) was:

Mg:Ti:Cl≈1:1.40:4.38.

Example 1.b

Jerry Cans—Polymerisation in Cascaded Slurry Reactor Train & Blow Moulding

The reactor system is a reactor train of three consecutive reactors R1,R2,R3, operated in a continuous mode at the process settings as indicated, with continuous discharge from one reactor into the next one and continuous removal of product from the last reactor. The specific polymerisation activity of the catalyst prepared using the catalyst A from the preceding step 1.a in the reactor system was found to be 18 to 23 kg PE/g Catalyst. All reactors were operated as suspension reactors under stirring, comprising anhydrous hexane as suspending liquid for the catalyst composition. Monomers were fed as a gas stream comprising further precisely dosed amount of hydrogen as a mass regulator as indicated.

The polymerization was carried out by adding first triethylaluminum as cocatalyst (=catalyst component B) and subsequently adding the preactivated catalyst component A prepared as described above in section 1.a, as a suspension diluted with diesel oil, into the reactor. The molar aluminum/titanium ratio was thus about 12.5:1.

TABLE I

Catalyst total 24.7 [mmol/L], dosed at 12 [mmol/h]
Cocatalyst/alumorganic compound: TEA, total 28.5 [mmol/L], dosed at 73 [mmol/h] active Al: 0.48 [mmol/L]

|  | unit | R1 | R2 | R3 |
|---|---|---|---|---|
| Temperature | ° C. | 80 | 84 | 85 |
| Internal Pressure | bar | 4.7 | 3.9 | 4.9 |
| Ethylene C2 | kg/h | 40.8 | 20.0 | 19.2 |
| Ethylene C2-ratio | % | 51 | 25 | 24 |

TABLE I-continued

Catalyst total 24.7 [mmol/L], dosed at 12 [mmol/h]
Cocatalyst/alumorganic compound: TEA, total 28.5 [mmol/L], dosed at 73 [mmol/h] active Al: 0.48 [mmol/L]

|  | unit | R1 | R2 | R3 |
|---|---|---|---|---|
| Hydrogen H2 | g/h | 17 | 8 | 5 |
| Butene C4 | g/h | 0 | 300 | 400 |
| Ethylene C2 | Vol. % | 45 | 64 | 78 |
| Hydrogen H2 | Vol. % | 38 | 22 | 12 |
| Butene C4 | Vol. % | 0 | 0.55 | 0.96 |
| pC2 | bar | 1.9 | 2.1 | 3.1 |
| H2/C2 | — | 0.83 | 0.34 | 0.14 |
| HLMI 21.6 kg | g/10 min | 16 | 8 | 5.5 |
| VZ | — | | | |
| density | g/cm$^3$ | | | 0.955 |

The properties of the product thus obtained, from blow moulding of jerry cans (JC) of 800 g, extruded in 8 s in discontinuous mode at 210° C., of dimension, are displayed in table II below. Shear rate was at least >1000 s$^{-1}$, more likely >1500 s$^-$. The FNCT, measured according to the method of Fleissner in Igepal solution (or an differently branded analogue of Igepal), was determined on compression moulded specimens of the polyethylene of exp. 1, not on wall sections taken from the moulded article.

TABLE II

|  | Target | Comp. example: Exp. 1 of EP-1228101 | Exp. 1 |
|---|---|---|---|
| Ethylene Split [%] | — | 35/50/15 | 50/26/24 |
| MFR 21.6 kg [g/10'] | 3.5-4.5 | 4.5 | 4.2 |
| Density [g/cc] | | 0.956 | 0.955 |
| Swell Ratio [%] | 180 ± 15 | 192 | 182 |
| FNCT 4 MPa/80° C. [h] | >4 | 10 | 4 |
| Atn −30° C. [kJ/m$^2$] | ≥140 | 134 | 168 |
| Shrinkage Prediction | Cr-like | too high | Very good |
| Surface Smoothness of JC (visually) | — | poor | Good |

Without wanting to be restricted by theory, it may be pointed out that the catalyst of the invention was found to provide for increased long-chain branching, as compared to the products obtained by the Ziegler catalyst from the prior art described in EP-1228101. Nevertheless, using a different Ziegler catalyst also providing for extremely high LCB contents did not result in equally well performing product in terms of surface smoothness, low gel content, acceptable FNCT and in particular in terms of shrinkage behaviour (data not shown). Excellent dimensional stability plus eventually superior die swell, allowing of better control of even wall thickness and contributing this way further to dimensional stability, is a unique features of the product of the invention, employing the catalyst of the invention. The product of the invention allows of good processing, as evidenced by the HLMI and a good wall thickness distribution. The FNCT values are not superior as compared to standard Ziegler products, but are obtainable in conjunction with afore said excellent dimensional conformity behaviour. For the time, it remains to be determined what property or properties distinguish the Ziegler catalyst of the invention.

It may further be pointed out that when using the same polyethylene for blow moulding standard 1-3 L test bottles used for an ESCR-like 'bottle burst test' practiced in many testing departments, the material of the present invention proved superior to the material of the comparative example, despite its lower FNCT value as given in table II above.

Addendum to Experiment 1—Blow Moulding & Warpage Measurement Protocol: The analyzed jerry cans (JC) were produced at 210° C. melt temperature on a Bekum machine BA 34.2 with grooved barrel extruder of 80 mm diameter and 20 D in length without breaker plate and sieve. The Bekum machine further consists of a side fed die head AKZ4 with an accumulator head for discontinuous mode, which can be switched on or off as needed. Die and mandrel have radii of 130 and 128 mm, respectively. The mould used was a C 17 mould, which is used for jerry cans of 20 l volume (see drawing in FIG. 1). All machine settings and machine parameters are given in Tab.2 below.

Blowing of the JC at 4 seconds push-out time took place in discontinuous mode by conveying the melt into the accumulator head at 70 kg/h (+/−2.0 kg/h). The melt was accumulated for 56.0 s and was then extruded at 4 s push-out time at 215 bar push-out pressure to produce a 800 g (+/−20 g) jerry can. The flash weight and the length of the pinch-off weld of the jerry can were recorded. The drum dimensions (height, length, width) were measured using a manual Vernier caliper of 0-1000 mm length with 200 mm measuring jaws and a precision of 0.1 mm. All machine parameters are given in Tab.2.

Jerry Can Dimensions—the original mould dimensions were given as:
Height: 402.3 mm
Length: 302.9 mm
Width: 245.0 mm The measured jerry can dimensions were then compared to the reference grade, which for all measurements was a unimodal chromium grade with HLMI 2. The aim was to produce a jerry can with dimensions similar to the reference grade since the former APC grade with Z501 catalyst had produced jerry cans, which had been too small in height but too big in length at the converter. The width of the final parts had not been a real issue and was acceptable.

Example 2 (According to the Invention)

L-Ring Drum, Industrial Standard

Ethylene was polymerized in a continuous process in three reactors arranged in series. An amount of 20.3 mmol/h of a Ziegler preactivated catalyst component A prepared as specified in experimental section 1.a above was fed into the first reactor together with 79 mmol/h triethylaluminum-alkyl (TEA) (with 0.4 mmol/l of active Al), as well as sufficient amounts of diluent (hexane), ethylene and hydrogen. The amount of ethylene (=50 kg/h) and the amount of hydrogen (=24 g/h) in the first reactor were adjusted so that the percentage proportion of ethylene and of hydrogen measured in the gas phase of the first reactor were 37% by volume and 43% by volume, respectively, and the rest was a mix of nitrogen and vaporized diluent. The polymerization in the first reactor was carried out at 80° C.

The slurry from the first reactor was then transferred into a second reactor, in which the percentage proportion of hydrogen in the gas phase had been reduced to 8% by volume, and an amount of 0.12 kg/h of 1-butene was added to this reactor alongside with 27 kg/h of ethylene. The amount of hydrogen was reduced by way of intermediate $H_2$ depressurization.

72% by volume of ethylene, 8% by volume of hydrogen, and 0.39% by volume of 1-butene were measured in the gas phase of the second reactor, the rest being a mix of nitrogen and vaporized diluent. The polymerization in the second reactor was carried out at 85° C.

The slurry from the second reactor was then transferred to the third reactor, in which the percentage proportion of hydrogen in the gas phase was increased again to 21% by volume. An amount of 23 kg/h of ethylene was added to the third reactor. A percentage proportion of 66% by volume of ethylene, 21% by volume of hydrogen, and 0.34% by volume of 1-butene was measured in the gas phase of the third reactor, the rest being a mix of nitrogen and vaporized diluent. The polymerization in the third reactor was carried out at 85° C.

The long-term polymerization catalyst activity required for the cascaded process described above was provided by a specifically developed Ziegler catalyst as described in the WO/FR mentioned at the outset.

The diluent is removed from the polymer slurry leaving the third reactor, and the polymer is dried and then pelletized.

Table 1 below gives the viscosity numbers, quantitative proportions wA, wB, and wC of polymer A, B, and C for the polyethylene composition prepared and the properties of the final pelletized resin.

The viscosity numbers (VN) for each reactor are given as measured for each reactor (from powder taken out of R1, R2 and R3, respectively). But also the "true or actual" contribution of R2 and R3 are calculated. When measuring the powder taken out of R2 in fact we are measuring the combined reactors R1 and R2. The same holds for powder taken out of R3, where we are also in fact measuring the combined powders of R1, R2 and R3. Therefore the contribution of what R2 and R3 make "on their own" is calculated using the below equations:

"True" R2 contribution:

$$VN_{R2} = \left(w_A\left(\frac{VN_B - VN_A}{w_B}\right)\right) + VN_B$$

"True" R3 contribution:

$$VN_{R3} = \frac{(w_A + w_B + w_C)VN_C - (w_A * VN_A) - (w_B * VN_{R2})}{w_C}$$

with
$w_A$=% wt proportion of reactor 1
$w_B$=% wt proportion of reactor 2
$w_C$=% wt proportion of reactor 3
$VN_A$=viscosity number measured on powder taken out of reactor 1
$VN_B$=viscosity number measured on powder taken out of reactor 2
$VN_C$=viscosity number measured on powder taken out of reactor 3
$VN_{R2}$=true viscosity number calculated (contribution) of reactor 2 alone
$VN_{R3}$=true viscosity number calculated (contribution) of reactor 3 alone

TABLE III

|  | Exp. 2 (LRD) | Comp. example: Exp. 1 of EP 1 576 049 B1 |
|---|---|---|
| $W_A$ [% by weight] | 50 | 40 |
| $W_B$ [% by weight] | 27 | 38 |

TABLE III-continued

|  | Exp. 2 (LRD) | Comp. example: Exp. 1 of EP 1 576 049 B1 |
|---|---|---|
| $W_C$ [% by weight] | 23 | 22 |
| VN1 [cm3/g] | 259 | 120 |
| VN2 [cm3/g] meas./calc. | 382/608 | 260/407 |
| VN3 [cm3/g] meas./calc. | 395/441 | 540/1533 |
| MFR 21.6 kg [g/10'] | 2.9 | 2.6 |
| Density [g/cc] | 0.954 | 0.953 |
| Swell Ratio [%] | 151 | 200 |
| FNCT 4 MPa/80° C. [h] | 4 | 8.5 |
| Atn −30° C. [kJ/m²] | 171 | 260 |
| Shrinkage | Very good | Bad |
| Surface Smoothness of JC (visually) | Very good | poor |

Even though the swell ratio, FNCT and impact strength of LRD example 1 are much lower than for the comparative sample, no issues were reported by the customers regarding processability or approval of mechanical tests.

What is claimed is:

1. A trimodal polyethylene comprising three polymeric weight fractions A,B,C, wherein the low molecular weight fraction A is a homopolymer and the medium and the high molecular weight fractions B and C, respectively, are copolymers of ethylene and 1-butene as the comonomer,
the polyethylene comprising 50 to 60% (w/w) of homopolymer A, 22 to 28% (w/w) of copolymer B, 18 to 24% (w/w) of copolymer C, and 0 to 5% (w/w) of non-polymeric additives and/or polymeric lubricants selected from the group consisting of: (i) colorants, (ii) antioxidants; (iii) stabilizers; (iv) inorganic or carbonic acids or acid anhydrides; (v) non-polymeric lubricants; (vi) a fluoropolymer lubricant; and (vii) polybutene-1, based on the total weight of the polymer, and wherein the polyethylene is obtained by stepwise polymerization in the presence of a solid Ziegler-Natta catalyst component, where the solid catalyst is the product of a process comprising (a) reacting magnesium diethoxide with titanium tetrachloride carried out in a hydrocarbon at a temperature of 50-100° C., (b) subjecting the reaction mixture obtained in (a) to a heat treatment at a temperature of 110° C. to 200° C. for a time ranging from 3 to 25 hours (c) isolating and washing with a hydrocarbon the solid obtained in (b), said solid catalyst component having a Cl/Ti molar ratio higher than 2.5,
wherein the trimodal polyethylene has a density of 0.950 to 0.960 g/cm³, a melt index (HLMI) according to ASTM D-1238, at 190° C. and 21.6 kg, of 2.9-6 g/10 min, and
the polyethylene is produced by polymerization with a Ziegler-Natta catalyst.

2. The trimodal polyethylene of claim 1, wherein the stepwise polymerization is carried out in such a way, optionally using a prepolymerized catalyst, that in a first step, the homopolymer A is obtained having a melt index according to ASTM D-1238, at 190° C. and 21.6 kg, of from 18 to 30 g/10 min, and wherein in a second step, copolymer B is obtained the polymer mixture in the reactor having a melt index according to ASTM D-1238, at 190° C. and 21.6 kg, of from 8 to 14 g/10 min, and wherein in a third step, copolymer C is obtained, the polymer mixture of A, B and C in the reactor having a melt index according to ASTM D-1238, at 190° C. and 21.6 kg, of from 3 to 6 g/10 min.

3. The trimodal polyethylene of claim 1, wherein the stepwise polymerization is carried out in three reactor steps wherein at least the first two reactor steps are carried out in suspension and wherein the last reactor step is carried out in a gas phase or suspension reactor.

4. The trimodal polyethylene of claim 1, having a dimensionless ratio of HLMI:$MI_5$ of from 16 to 23, wherein $MI_5$ is the melt index according to ASTM D-1238, at 190° C. and 5 kg.

5. The trimodal polyethylene of claim 1, wherein the reaction of the magnesium alcoholate with $TiCl_4$ is carried out at a molar ratio of Ti/Mg in the range 1.5 to 4, at a temperature from 60 to 90° C. and for a time of 2 to 6 hours.

6. The trimodal polyethylene of claim 5, wherein the Ti/Mg ranges from 1.75 to 2.75.

7. The trimodal polyethylene of claim 1, wherein the heat treatment in step (b) is carried out at a temperature ranging from 100 to 140° C., for a period of time ranging from 5 to 15 hours.

8. The trimodal polyethylene of claim 1, wherein the Cl/Ti molar ratio is at least 3.

9. The trimodal polyethylene of claim 1, wherein the solid obtained after (c) has the following composition:
Mg:Ti:Cl=1:0.8–1.5:3.2–4.2.

10. The trimodal polyethylene of claim 1, wherein the solid catalyst component is further contacted in a step (d) with an aluminum alkyl halide compound selected from dialkylaluminum monochlorides of the formula $R_2^3AlCl$ or the alkylaluminum sesquichlorides of the formula $R_3^3Al_2Cl_3$ in which $R^3$ can be identical or different alkyl radicals having 1 to 16 carbon atoms.

11. The trimodal polyethylene of claim 10, wherein the aluminum alkyl halide is an aluminum alkylchloride compound, and wherein the aluminum alkylchloride compound is used in amounts such that the Al/Ti molar ratio, calculated with reference to the Ti content of the solid catalyst component as obtained by the previous step, is from 0.05 to 1.

12. A process comprising blow molding the trimodal polyethylene of claim 1.

13. The trimodal polyethylene of claim 1, wherein the stepwise polymerization further comprises the presence of trialkylaluminum as a cocatalyst component.

14. The trimodal polyethylene of claim 2, wherein in the stepwise polymerization, the partial pressure of 1-butene is controlled at 3 to 10% of that of ethylene in the gas phase of a reactor in the second step.

15. The trimodal polyethylene of claim 2, wherein the melt index of the polymer mixture is from 4 to 5 g/10min.

* * * * *